US007280187B1

(12) United States Patent
Yoshida

(10) Patent No.: US 7,280,187 B1
(45) Date of Patent: Oct. 9, 2007

(54) METHOD FOR RESOLVING PHASE IN ELECTRONIC SPECKLE INTERFEROMETRY

(75) Inventor: Sanichiro Yoshida, Hammond, LA (US)

(73) Assignee: Southeastern Louisiana University, Hammond, LA (US)

( * ) Notice: Subject to any disclaimer, the term of this patent is extended or adjusted under 35 U.S.C. 154(b) by 115 days.

(21) Appl. No.: 11/248,856

(22) Filed: Oct. 12, 2005

(51) Int. Cl.
*G01B 9/02* (2006.01)
(52) U.S. Cl. ............... 356/35.5; 356/512; 356/521
(58) Field of Classification Search ............... 356/35.5, 356/511
See application file for complete search history.

(56) References Cited

U.S. PATENT DOCUMENTS

| 4,225,240 | A | 9/1980 | Balasubramanian |
| 5,004,345 | A | 4/1991 | Hung |
| 5,666,197 | A | 9/1997 | Guerra |
| 6,717,680 | B1 | 4/2004 | Kuchel et al. |
| 2004/0057054 | A1* | 3/2004 | Toyooka et al. ............ 356/496 |

OTHER PUBLICATIONS

S. Yoshida, Suprapedi, R. Widiastuti, E. Tri Astuti and A. Kusnowo, Phase evaluation for electronic speckle-pattern interferometry deformation analysis, Optics Letters, 1995, 755-757, vol. 20, No. 7.*
S. Yoshida, Suprapedi, R. Widiastuti, E. Tri Astuti and A. Kusnowo, Phase evaluation for electronic speckle-pattern interferometry deformation analyses, Optics Letters, 1995, 755-757, vol. 20, No. 7.

* cited by examiner

*Primary Examiner*—David Bruce
*Assistant Examiner*—Jonathan M Hansen
(74) *Attorney, Agent, or Firm*—Jones, Walker, Waechter, Poitevent, Carrere, & Denegre, L.L.P.

(57) ABSTRACT

The invention is a method of determining the phase difference between two interferometric images. The method includes the steps of measuring the intensities of the two beam arms, and measuring the intensities of the interfering beam arms at two different times (two frames). From the recorded data, the phase angle between the arms can be determined for each frame. These frame phase angles subtracted, and the sine of the difference is taken. The resulting data set is examined to determine a multiplicative factor that converts the minimum and maximum to the bounds of the sine function (−1, +1). This multiplicative factor is applied to a bounded trig function of the difference of the frame angles, and the inverse of the bounded trig function is taken, resulting in the phase difference between frames.

11 Claims, 7 Drawing Sheets

A typical ESPI arrangement for an in-plane sensitive interferometer. Coherent light from a laser is coupled to a single-mode fiber, amplitude divided, and spatially filtered into two beams of equal intensity, which illuminate the object at equal and opposite angles.

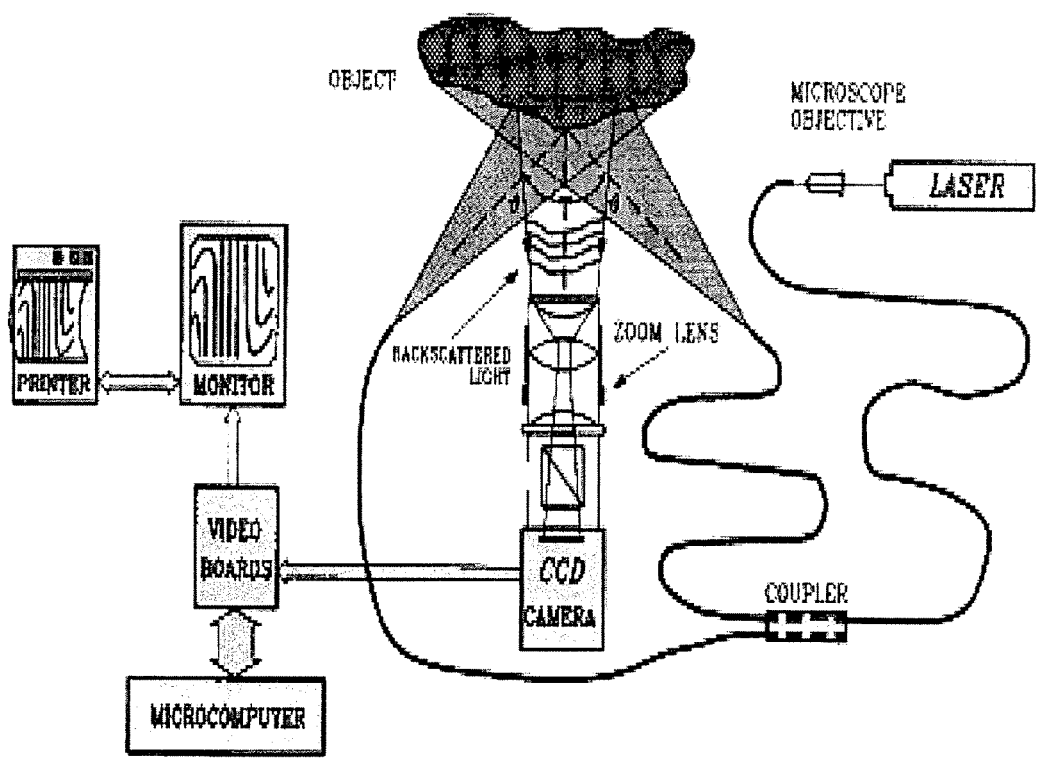
Figure 1: A typical ESPI arrangement for an in-plane sensitive interferometer. Coherent light from a laser is coupled to a single-mode fiber, amplitude divided, and spatially filtered into two beams of equal intensity, which illuminate the object at equal and opposite angles.

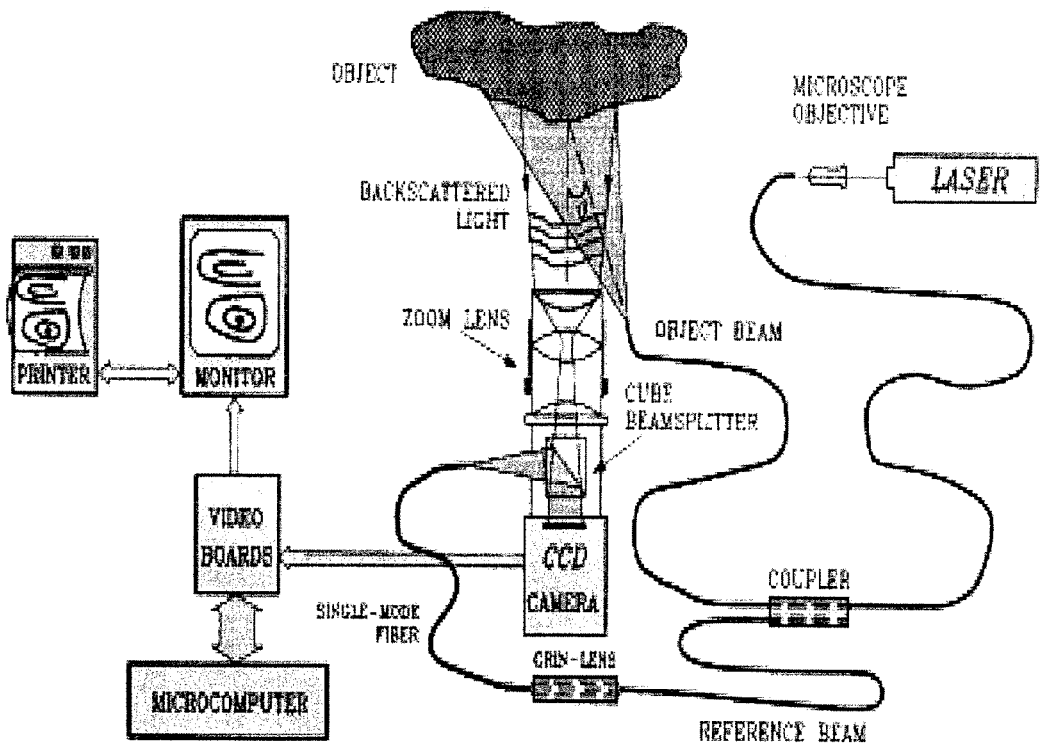

Figure 2: A typical ESPI arrangement for an out-of-plane sensitive interferometer. Coherent light from a laser is coupled to a fiber and then split by a bi-directional coupler into reference and object beams. The object beam illuminates the surface. The light scattered from the object is collected by a lens and imaged on the CCD, where it is mixed coherently by the beam splitter with the reference beam.

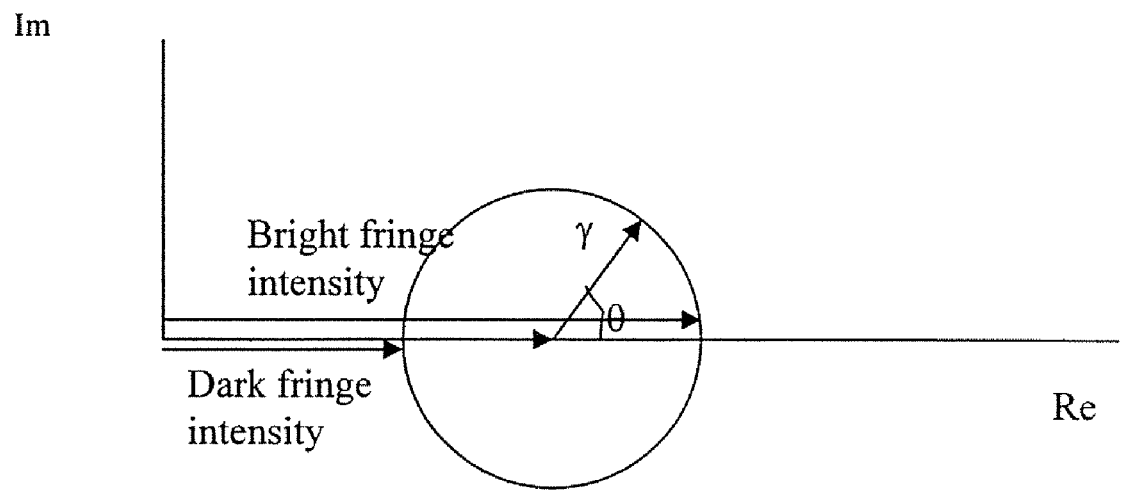
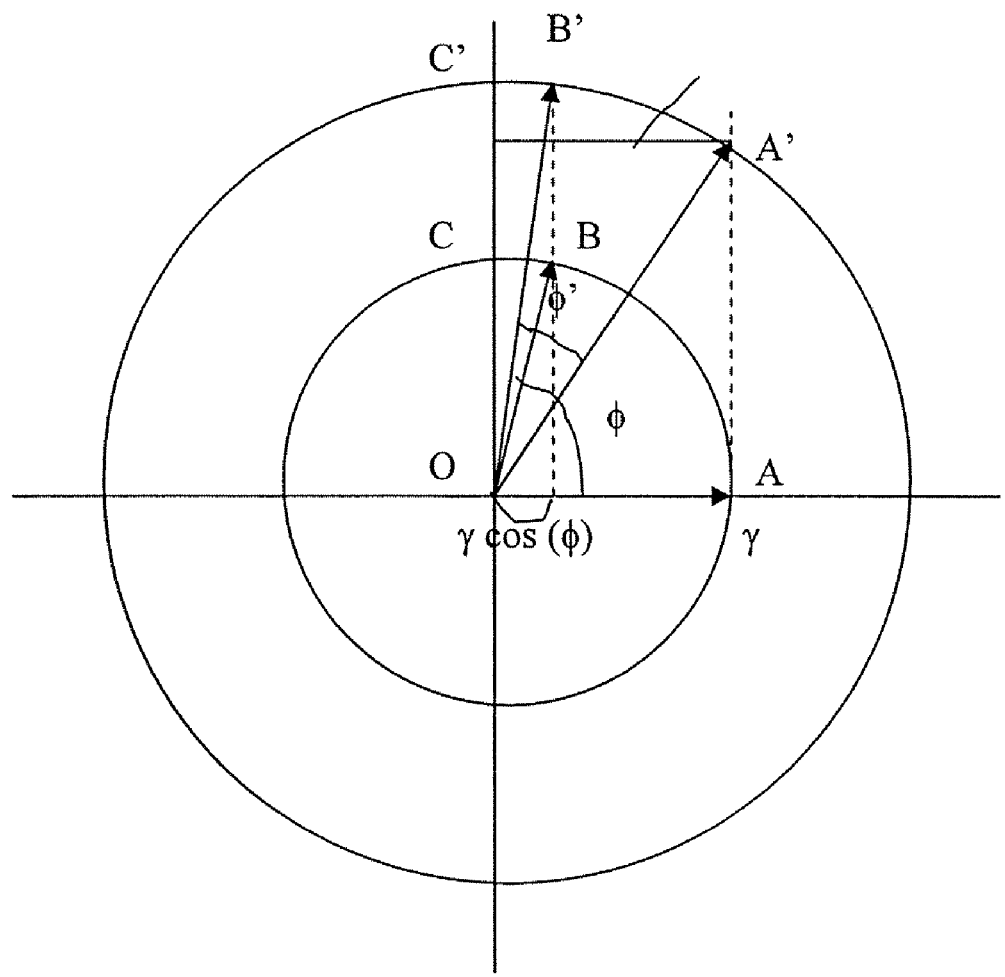
Fig. 3 Vector representation of interference

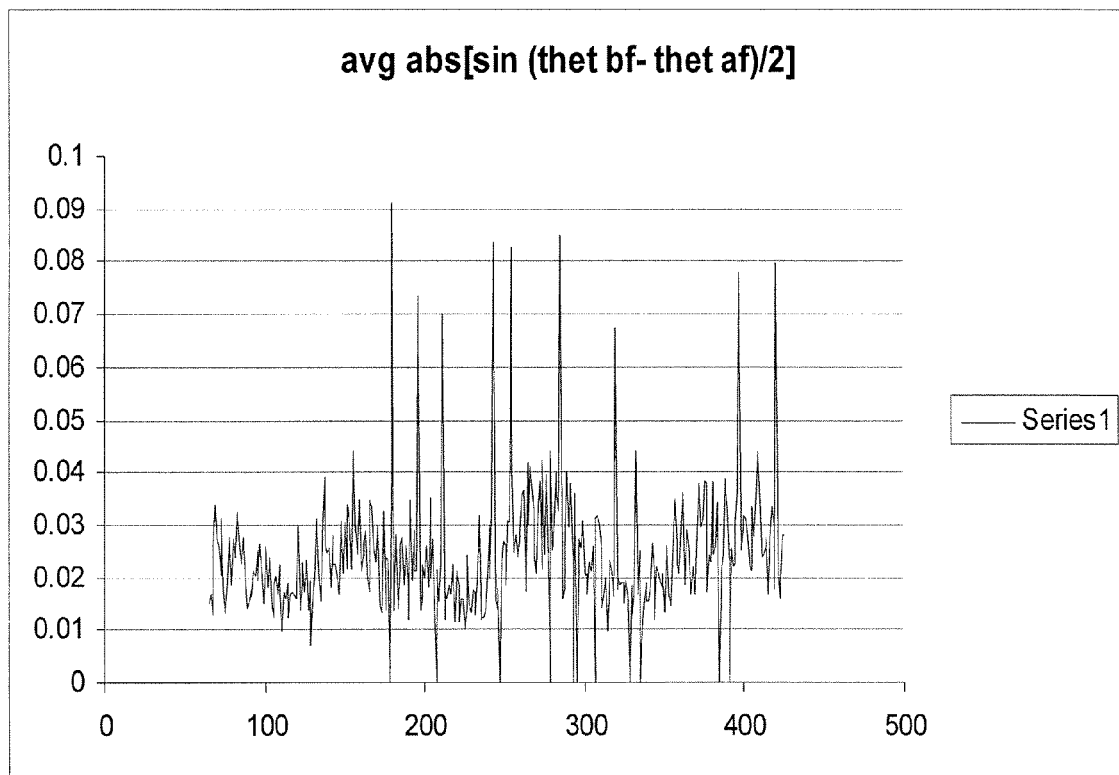
Fig. 4 An example of the sine curve obtained in step 7

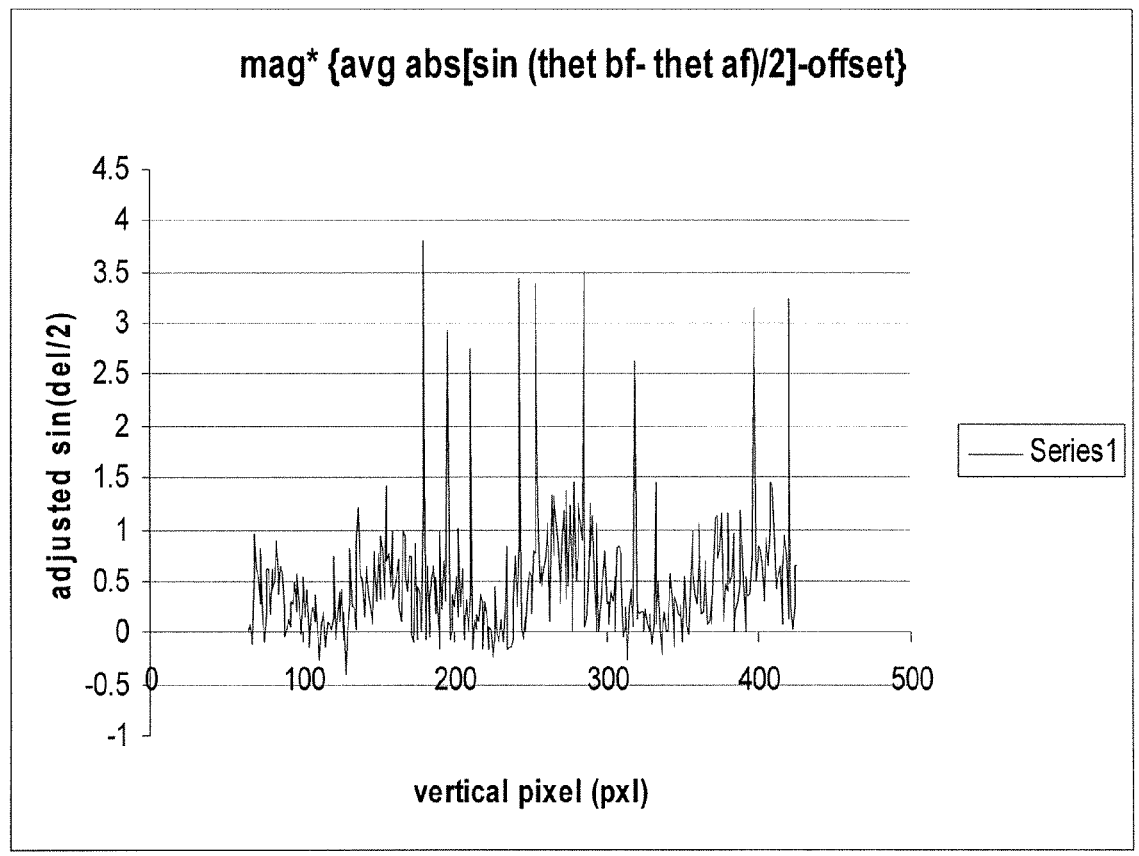
Fig. 5 Corrected sine curve obtained in step 10

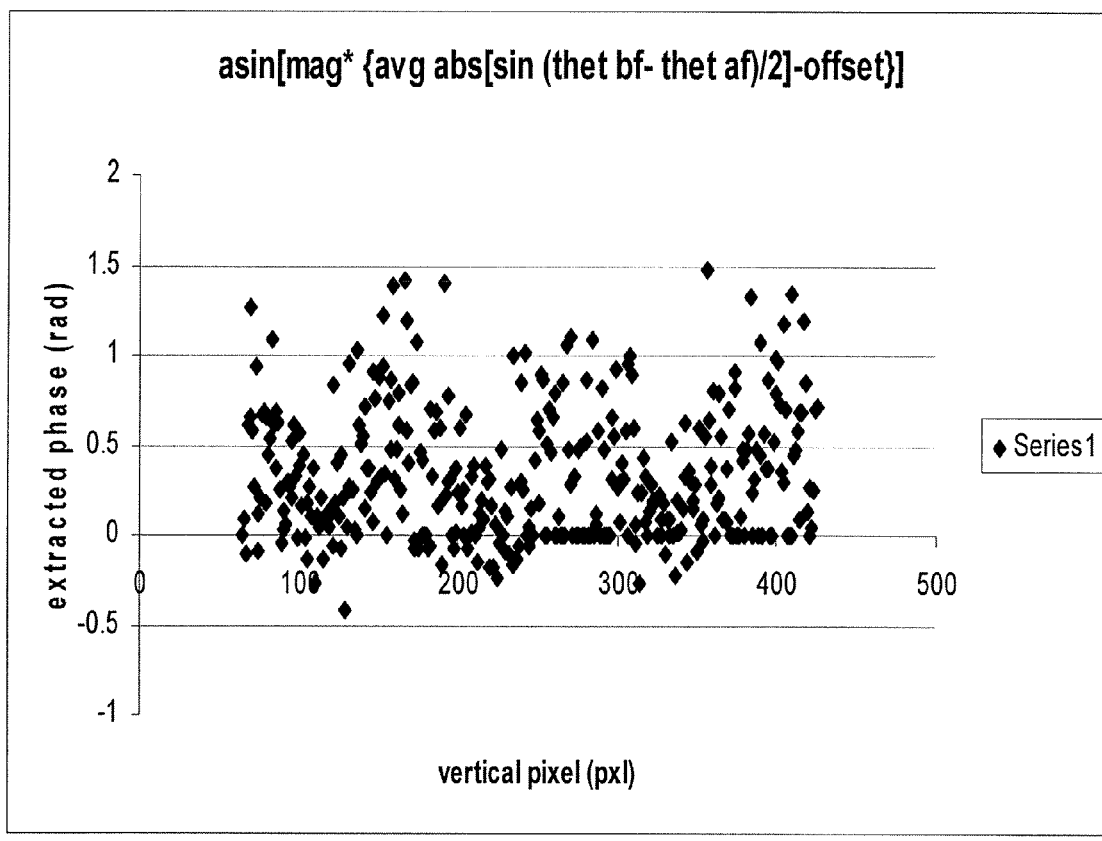
Fig. 6 Result of step 11

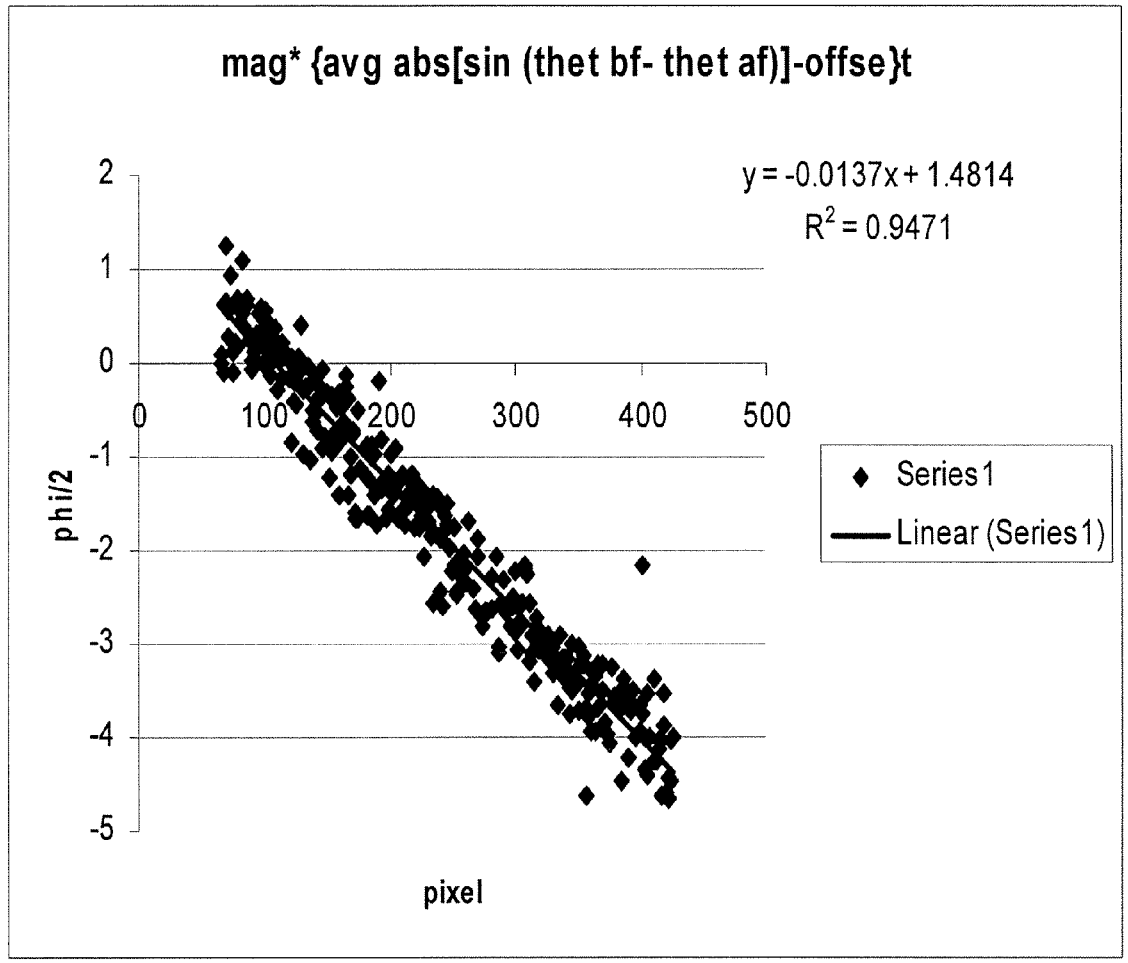
Fig. 7 Unfolded ϕ/2, viewing figure 6 as a series of parallel line segments

METHOD FOR RESOLVING PHASE IN ELECTRONIC SPECKLE INTERFEROMETRY

FIELD OF THE INVENTION

The invention relates to electronic speckle pattern interferometry and in particular to methods of determining phase from a speckle image comparison.

BACKGROUND OF THE INVENTION

Optical path length measurements, made by interferometry, are highly sensitive and adaptable to the study of a wide range of physical phenomena because they sensitively measure small changes in the optical path length induced by physical process, of the order of a fraction of an optical wavelength.

Optical path length variations may be induced in the distance between a point on the surface of an object and the corresponding point on the image plane formed by an imaging system used to make an image of the object in the presence of externally applied perturbations. A number of physical and chemical phenomena provide mechanisms for inducing spatial distribution in such changes of the optical path length that may then be interferometrically probed. Such mechanisms could include thermal or electromagnetic excitation, or acoustic or mechanical perturbation of the material, or chemically modifying the object's surface. When interferometry is used to record images of such objects, it may provide a method of imaging the physical process that induces the optical path length change. Because of the many physical and chemical phenomena which are capable of producing optical length changes, which interferometry may potentially probe with very high optical length resolution, imaging methods based on interferometry have widespread applications in industrial measurement.

When a material sample is subjected to a perturbation, any resulting changes in the optical path length to the image plane may be potentially sensed by an interferometer. Optical path length variations occurring along the transverse coordinate of the interferometer may be probed to form an interferometric image: the transverse coordinates of the interferometer are defined as occupying orthogonal directions, (x,y) that lie in the image plane. The primary interferometric image produced by the interferometer is called an interferogram. The interferogram is defined as an image formed by the superposition of two beams of coherent light, I1 and I2, on the image plane of the interferometric imaging system. The interferogram is electronically recorded (such as by a camera considered to be a generalized imaging device composed of an array of optical sensing elements (or image pixels) operating over the wavelength range used by the interferometer beams) and the information is stored in a data storing and processing system. The interferogram is commonly referred to as a speckle image when a coherent light source is used and the object's surface roughness causes random reflection forming speckles on the image plane. When multiple images are taken, for instance of an object in various stages of deformation, each speckle image is considered a frame.

In speckle pattern interferometry, a speckle pattern image of the object before modification or perturbation (henceforth considered as a "deformation") is electronically stored. Next a speckle pattern image of the object after deformation is electronically stored. By taking the difference between the speckle pattern images before and after deformation it is possible to observe a speckle interference fringe pattern. The interference pattern appears as dark and light regions which show the deformation distribution.

General equipment for creating interferometric images is shown in FIGS. 1 and 2. The apparatus generally consist of:

a) a coherent radiation source, such as a laser, the radiation source emits a source beam having a spatial coherence length;

b) a beam splitter at which the source beam is separated (by partial reflection or other means) into one (or more) beam(s). In "in-plane" interferometry, the source beam is split into two probe beams I1 and I2. Each probe beam illuminates the object, but are separated by an angle alpha. In-plane interferometry is sensitive to in-plane displacements. In "out-of-plane" interferometry, the source beam is split into a probe beam I1 which illuminates the object and a reference beam I2 which is phase coherent with the probe beam and which combines with the illumination beam after interaction with the object. Out-of-plane interferometry is sensitive to out-of-plane displacements.

c) a test medium positioned to be intersected by the probe beam(s) and reflect the incident radiation, and d) an image plane or surface in which the reflected probe(s) and reference beam are superimposed so as to produce electromagnetic wave interference, thus forming an image of the object.

The system may include lenses, mirrors or other beam directing elements to accomplish the beam splitting. In making a measurement, the intensity (the squared amplitude of the interfered waves from the two beam lines) is recorded by the charged coupled camera device or similar device. Hence, it is desirable to recover the phase information from the amplitude information recorded. Several methods have been proposed, most require shifting the relative phase of the probe beams in known amount. All such methods are computationally burdensome. In addition, they require multiple images be taken, therefore are not applicable to applications where the deformation is continuous because the phase change to be evaluated varies when the extra images are taken.

SUMMARY OF THE INVENTION

The invention is a method of determining the phase difference between two interferometric images. The method includes the steps of measuring the intensities of the two beam arms, and measuring the intensities of the interfering beam arms at two different times (two frames). From the recorded data, the phase angle between the arms can be determined for each frame. These frame phase angles are subtracted, and the sine of the difference is taken. The resulting data set is examined to determine a multiplicative factor that converts the minimum and maximum to the bounds of the sine function (−1, +1). This multiplicative factor is applied to a bounded trig function of the difference of the frame angles, and the inverse of the bounded trig function is taken, resulting in the phase difference between frames.

BRIEF DESCRIPTION OF THE DRAWINGS

FIG. 1 is a schematic detailing general apparatus used for in-plane interferometry.

FIG. 2 is a schematic detailing general apparatus used out-of-plane interferometry.

FIG. 3 is a vector graphical representation of interference.

FIG. 4 is a graphic representation of the sine of the phase difference.

FIG. 5 is a graphic representation of the normalized data shown in FIG. 4.

FIG. 6 is a graphic representation of the operation of the arcsine on the data in FIG. 5.

FIG. 7 is a graphic representation of the operation of the unfolded phase for the data in FIG. 6.

DETAILED DESCRIPTION OF THE INVENTION

The invention is a procedure to determine the phase of a perturbed object in an interferomic device. The invention can be used for both in-pane and out-of-plane interferometry. The following notation will be used.

- $I(x,y)$ is the measured output beam intensity of the non-deformed object, as measured on the in-plane interferogram by means of the imaging system such has an array of pixels having individual intensities and each having corresponding respective transverse coordinates (x,y); (note, "non-deformed" refers to the lack of a later deformation or movement; for instance if three frames are recorded, F1, F2 and F3 at different times; F1 is a non-deformed frame with respect to F2 and F3; while F2 is a non-deformed frame only with regards to the later deformed frame, F3).
- $I_d$ (x,y) is the output beam intensity of the perturbed (henceforth considered a deformation) object
- $I_1$ (x,y) is the beam intensity measured on one arm of the device, and $I_2$ (x,y) is the beam intensity measured on the other arm of the device.

The first step in any phase reconstruction method is to record the intensity interferograms I (x,y), $I_1$ (x,y) $I_2$ (x,y). The intensity of the interference term can be written in the following form, where $I_1$ and $I_2$ represent the intensity of the respective arm of the device:

$$(I)_{coh} = (I_{1\ coh}) + (I_{2\ coh}) + 2\sqrt{(I_{1\ coh} I_{2\ coh})} \cos \theta_{coh} \quad (1)$$

where $\theta$ refers to the phase difference between the optical paths of the two beam arms. Note that in noiseless perfectly controlled environment, interference occurs only for the coherent part of the arm intensities. Hence, equation (1) references $\theta_{coh}$, etc to represent the coherent part of the light. However, in actuality, the intensities recorded by the instrument (called the apparent intensity) contain non-coherent part of the light caused by various uncontrolled factors such as the background light, scattering due to dust in the air etc. Consequently, the apparent phase difference expressed in the form of eq. (1) using recorded intensities includes a portion attributable to non-coherent factors. Due to the non-coherent factors, the apparent phase angle $\theta_{appr}$ can be expressed in terms of the true phase angle $\theta_{true}$ as $$\cos \theta_{appr} = \gamma \cos \theta_{true}, \quad (2)$$

where $\theta_{true}$ corresponds to $\theta_{coh}$ of equation (1)

where the modulation factor ($\gamma$) is less than unity ($\gamma<1$), or $$\theta_{appr} = \cos^{-1}((\gamma)\cos\theta_{true}) \quad (3)$$

hence $$I = (I_1) + (I_2) + 2\gamma\sqrt{(I_1 I_2)} \cos \theta_{true} \quad (4)$$

Hence, determination of the actual phase information requires knowledge of $\gamma$. Similarly, the measured intesisity after deformation is $$I_d = (I_{1d}) + (I_{2d}) + 2\sqrt{(I_{1d} I_{2d})} \cos \theta_{d\ appr}$$

or $$I_d = (I_{1d}) + (I_{2d}) + 2\gamma\sqrt{(I_{1d} I_{2d})} \cos \theta_{d\ true}$$

Since the source beam remains the same, $I_{1\ d} = I_1$ and $I_{2\ d} = I_2$.

Schematically, FIG. 3 demonstrated the distinction between $\theta_{true}$ and $\theta_{appr}$ can be represented by vectors on a complex plane. As shown in FIG. 3, the measured intensity is represented by the real part of the vectors. When the waves from the two arms interfere and result in complete destructive interference, the real part is at the minimum ($\theta=\pi$). When the waves from the two arms two arms interfere and result in complete constructivel interference, the real part is at the maximum ($\theta=0$ or $2\pi$). The former corresponds to a dark speckle and the latter to a bright speckle (Note that in the case of ESPI, the value of $\theta$ results from superposition of a number of light rays coming from the source to the same point on the target and therefore it is completely random).

Using equation 4 to solve for $\gamma \cos \theta_{d\ true}$, $$[I - \{(I_1) + (I_2)\}]/2\ \sqrt{(I_1 I_2)} = \gamma \cos \theta_{true} = \cos \theta_{appr}$$

Similarly, $$[(I_d) - \{(I_1) + (I_2)\}]/2\ \sqrt{(I_1 I_2)} = \gamma \cos \theta_{d\ true} = \cos \theta_{appr}$$

Now express the calculated $\theta_{d\ appr}$ (the angle after perturbation) as the phase angle prior to perturbation $\theta_{appr}$ (the calculated before angle) plus an additive phase difference variable $$\theta_{d\ appr} = \theta_{appr} + \phi' \quad (5)$$

Here $\phi'$ denotes the false additive phase difference based on the apparent phases $\theta_{d\ appr}$ and $\theta_{appr}$. Examination of the lower figure in FIG. 3 reveals that when the true additive phase difference is equal to $\pi/2$ (causing the maximum intensity in the interference, i.e., the term containing the phase in the expression of I is at the maximum) the false additive phase difference is at its maximum value $\phi'_{max}$, and that it sine is equal to $\gamma$; $\sin(\phi'_{max}) = \gamma$. Also for a given additive phase, it can be shown that $\phi'$ is related to true phases as $$\phi' = \cos^{-1}[\gamma \cos(\theta_{d\ true})] - \cos^{-1}[\gamma \cos(\theta_{true})] \quad (6)$$

To simplify this equation, an approximation will be made that $\cos(\theta_{true}) = 1$. The following analysis demonstrates the validity of this approximation. Consider the intensity contained in a single pixel. A number of combinations of coherent superposition of light rays fall in the pixel. Therefore, the varying term of the intensity contained by the pixel can be written as $$I_{bf} = \gamma(2\sqrt{I_1 I_2})[\cos \theta_{bf1} + \cos \theta_{bf2} + \cos \theta_{bf3} + \cos \theta_{bf4} + \ldots] \quad (a)$$

Here $I_{bf}$ corresponds to I at time T1 (before perturbation); $\theta_{bf1}, \theta_{bf2}, \ldots$ are random phases representing the coherent superposition of the light rays ($\theta_{true}$). Since these random phases are considered to be evenly distributed over the range of $-\pi/2$ to $+\pi/2$, the total intensity can be put in the following form. Only a half period is considered as the square amplitude of the intensity is measured by the CCD camera, but the same argument holds for the entire range of $-\pi$ to $+\pi$.

$$I_{bf} = 2\gamma\sqrt{I_1 I_2} \int_{-\pi/2}^{\pi/2} \cos\theta \, d\theta = \qquad (b)$$

$$2\gamma\sqrt{I_1 I_2} \, [\sin\theta]_{-\pi/2}^{\pi/2} = 2\gamma\sqrt{I_1 I_2} \cdot 2 = 4\gamma\sqrt{I_1 I_2}$$

After the displacement, all of these before phase shift by $\phi$, so $$I_{af} = \gamma(2\sqrt{I_1 I_2})[\cos(\theta_{b/1}+\phi)+\cos(\theta_{b/2}+\phi)+\cos(\theta_{b/3}+\phi)+\cos(\theta_{b/4}+\phi)+ \ldots] \qquad (c)$$

Where $I_{af}$ corresponds to $I_d$ (I at time T2 after perturbation, where T2>T1), and $\theta_{bf}+\phi$ corresponds to $\theta_{d\,true}$ In the same way as the before state, the intensity can be expressed as $$I_{af} = 2\gamma\sqrt{I_1 I_2} \int_{-\pi/2}^{\pi/2} \cos(\theta+\phi) \, d\theta = \qquad (d)$$

$$2\gamma\sqrt{I_1 I_2} \, [\sin\theta]_{-\pi/2+\phi}^{\pi/2+\phi} = 2\gamma\sqrt{I_1 I_2} \, [\sin(-\pi/2+\phi) - \sin(\pi/2+\phi)] =$$

$$2\gamma\sqrt{I_1 I_2} \, [-\cos\phi - \cos\phi] = -4\gamma\sqrt{I_1 I_2} \cos\phi$$

So, with reference to the "before phase," the "after phase" can be considered as the before phase rotated by $\theta$ on the complex plane. This is equivalent to setting $\theta_{true} = 0$ in eq. (6), or $\cos(\theta_{true}) = 1$.

The validity of the assumption is based upon the reasonableness of evenly distributed random phase $\theta_i$ in eqs. (a). This depends on the quantity of different random phases that are associated with a single pixel, which further depends on various factors including the pixel size relative to the speckle size (and hence the brightness and/or the magnification of the image because the speckle size depends on them) and the surface roughness of the target. However, empirical modeling suggests that the assumption is reasonable.

Hence to determine the phase difference, the following steps must be taken

Step 1 Measure $I_{bf}$ (x,y) the intensities before perturbation

Step 2 Measure $I_{af}$ (x,y) the intensities after perturbation

Step 3 Measure the intensities along arm 1 $I_1$ (x,y)

Step 4 Measure the intensities along arm 2 $I_2$ (x,y)

Step 5 Compute $\theta_{bf}' = \cos^{-1}[(I_{bf}-I_1-I_2)/2\sqrt{I_1 I_2}](x,y)$ Where $\cos\theta_{bf}'(x,y) = \gamma \cos\theta_{bf}(x,y)$ Step 6 Compute $\theta_{af}' = \cos^{-1}[(I_{af}-I_1-I_2)/2\sqrt{I_1 I_2}](x,y)$ where $\cos\theta_{af}'(x,y) = \gamma \cos\theta_{af}(x,y)$ Step 7 Compute $|\sin[(\theta_{af}'-\theta_{bf}')]|$ (x,y) Note, this is equivalent to computing $|\sin(\phi(x,y)|$.

Generally, the image intensity data measured in the pixel is positive as the signal voltage is positive. Hence, a phase value in the range of 0 to $\pi$ will be computed when arccos is taken. Consequently, the results of step 5 and 6 are folded in between 0 and $\pi$ (in the range of 0 to $\pi$, where cosine is positive). It may be desirable to divide $\theta_{af}'-\theta_{bf}'$ by 2 in step 7 in order to compare results with the standard substraction method employed for determining phase (another number could be utilized as a dividend) Division is not necessary. Other bounded trigonometric functions can be used, such as cosine, with suitable modification of the argument to account for periodicity of the argument.

Step 8 Take the average of $|\sin[(\theta_{af}'-\theta_{bf}')/k]|$ (x,y)(or other trig function utilized) obtained in step 7 (where k is the dividend used in step 7 (k can be equal to 1)) over several (about 10) pixels, preferably choosing an orientation for the averaging along an axis parallel to the nearest dark fringe to the pixel of concern. By choosing an orientation parallel to the dark fringe border, it is more likely that these chosen pixels more closely approximate the same $\theta_{af}'-\theta_{bf}'$ as the pixel of concern.

Filter means other than an averaging process can be utilized to reducing noise in the resulting signal can be undertaken, such as filtering $|\sin[(\theta_{af}'-\theta_{bf}')/k]|$ using a suitable filter, such as a median filter or center averaging after rejecting outliers, etc. For instance, a datapoints that are greater than 1 or 2 or 3 standard deviations from the mean could be eliminated. Also, instead of averaging or filtering over the trig function, an average or filter could be undertake over the argument to the trig function, that is, over $\theta_{af}'-\theta_{bf}'$.

Step 9 Use the range of $|\sin[(\theta_{af}'-\theta_{bf}')/k]|$ to calculate $\gamma$ (assuming that $\sin(\theta_{af}'-\theta_{bf}')$ (x,y) $= \gamma \sin(\theta_{af}-\theta_{bf})$ (x,y)).

Since the normal variation of abs(sin $\theta$) is equal to 1, the variation in abs(sin $(\theta_{af}'-\theta_{bf}')$ (x,y)) over the plane of a single recorded frame will be equal to $\gamma$. Hence, $\gamma$=peak value of abs($(\theta_{af}'-\theta_{bf}')$ )(x,y). In general, it is preferred that the recorded phase information have at least two dark fringes (for continuous deformation) to make certain that the phase varies from zero to a maximum value, to ensure that the range reflects $\gamma$.

The system contains noise that should be accounted for prior to selection of the "peak" value. For instance, shown in FIG. 4 is the result data from step 8 for a vertical column of pixels (that is (x,y) points, where Y=constant). Here a vertical column is used as an approximation of the entire plane data. Notice the large point to point variation. The data should be examined for point-to-point variations from the fitted function (here, the sin), and data outside some window about the fitted function can be ignored as noise. The "peak" selected for a data set can be chosen from a calculated fitted "sine" curve (such as a least square fit) fitted to the filtered dataset, or using some other method. For instance, a true sine curve will have all the peaks of the resultant function equal. However, notice in FIG. 4 that three "peaks" are shown, varying from about 0.28 to 0.35, where the variation is generally due to inherent noise and equipment limitations such as non-flat spatial distribution of the arm intensity over the object. Here the center of the beam is usually higher accounting for the higher peak value for the middle peak in FIG. 4. If the peaks are different, an average, a median, or a mode or some other statistical method can be used to select "peak" value to use for $\gamma$. Alternatively, as discussed, the peak from a fitted sine function can be chosen, where the above-mentioned spatial distribution of the arm intensity can be included in the fit. Indeed, a two dimensional least square fit of sin (x,y) can be made with the given dataset, and gamma selected from the peak of this fitted two dimension function.

Practically, this step can be substituted by various filling algorithms. One acceptable procedure is as follows: (a) select an offset from $|\sin[(\theta_{af}'-\theta_{bf}')/k]|$ (or the filtered results from step 8) so that the minimum of the new shifted function becomes zero, and (b) find the "peak" value of the $|\sin$ $[(\theta_{af}'-\theta_{bf}')/k]|$ function, and calculate the difference. Another means could be to select the peak value of the least noisy sine-like period, or take the average of all the peak values if all the periods are equally noisy, or find the peak of a least squares type fitted function. Experiments show that it is a good assumption that for a given interferometer setup γ is the same for the whole area of the image.

Shown in FIG. 4 is an example of the resultant function from the data set for a fixed deformation (here a rotation). The offset or shift chosen is 0.015, and the peak value chosen was taken from the peak of the middle period (=0.035). Hence, the value of γ is 0.035-0.015=0.02.

The data used to develop FIGS. 4-7 was taken from an experimental setup of a rotating target plane described in S. Yoshida et al, Opt Lett., 20, 755 (1995) (hereby incorporated by reference). The plane target was rotated around the axis perpendicular to the plane, and measured the horizontal displacement using a horizontally sensitive interferometer. The recording camera was a CCD camera where the CCD camera's image plane consisted of ~500 column×~500 row of pixels. Each pixel was averaged within a neighborhood (a square 3×3 neighborhood was used, each neighborhood encompassing 9 pixels). "Before" and "after" correspond to two rotational positions of the target.

Step 10 Multiply the correction factor of 1/γ (in the case of the above example 1/0.02=50), to "|sin $[(\theta_{af}'-\theta_{bf}')/k]|$ (x,y) obtained in step 7—offset." This results in a curve like FIG. 5, which should correspond to sinϕ/k−1/γ (offset)

Step 11 Compute arcsine (inverse sine) of the result of step 10 (or inverse of the selected trig function). FIG. 6 shows the results of this step on the data shown in FIG. 5. Ignoring the offset, this should result in ϕ/2 (if k=2), the true phase difference (after phase-before phase). Here the word offset is used to mean the phase value of the center of rotation where the displacement is zero and the phase value is an integer multiple of 2π.

Step 12. Unfold the phase resulting from step 11. This unfolding is necessary because the phase value is folded in the range of 0 to π/2 in step 7. To determine the unfolding, information from sources other that of the particular (x,y) point under consideration is needed to determine the sign of the folded phase.

From a single point measurement, we cannot determine the direction of the displacement, as is the case of the conventional subtraction method, because the pixel intensity contained in a CCD camera is always a positive voltage proportional to sin (ϕ/2)), we cannot tell whether ϕ>0 or ϕ<0. In other words, we cannot tell whether the displacement is rightward or leftward (upward or downward). If the form of ϕ is known, for example, the displacement is a uniform linear function of (x,y)(e.g, ϕ=ax+by+c) we can use the expected form for the functional fit. Note that the equations above deal with two dimensions (x,y). However, many interferometers are sensitive to a single dimension, and for such an instrument, the equations will reduce to single dimensional dependency.

If ϕ(x,y) is not an explicit or implicit function of (x,y), a functional can be chosen to best fit the phase difference of the deformation in order to represent the phase difference as a smooth function (it is assumed that the deformation represents a continuous deformation).. For instance, a polynomial approximation fit could be utilized, such as ϕ(x,y) =$a_0+a_1x+b_1yt+a_2 x^2+b_2y^2$ clxy+ . . . Other two dimensional functional forms could be used (such as a Fourier (x,y) fit), Bessel function fit, etc)(or a one dimensional fit if the interferometer is sensitive to only one direction). Note that although the minimum value of sin [ϕ'] is equal to 0 theoretically (corresponding to ϕ'=0, 2π, . . . ), the actual value can be a non-zero value for various reasons such as the electric noise in the pixel value of the CCD camera. Therefore, it is a good idea to use a non-zero value for $a_0$.

In the present example, the expected dependence of the displacement on the vertical coordinate (pixel) is linear since the deformation is a fixed rotation. Hence, the unwrapped phase should be represented by a straight line, and the wrapped phase should be represented by a series of parallel line segments such as \\\ or ///, where the break from one segment to another indicates the need to add a multiple of π/2. Using this information, a best fit to the data of FIG. 6 provides, for the vertical pixel column chosen, the best fit unwrapped phase to be ϕ=−0.0137r+1.4814, where r is the coordinate along the vertical column from a reference point. The closeness of the fit is demonstrated in FIG. 7. A fit over a vertical column in this case is sufficient as the "deformation" is a simple rotation and the angle of rotation is the same for each vertical column for a given frame. Another method to unwrap the phase (for a continuous deformation) would be to chose a starting point, and view the rate of change in the data set to determine the need to add or subtract pi/2 to adjacent points. However, such a method requires a fairly clean (i.e. non-noisy) data set.

Finally, if the assumption associated with the use of eqs. (b) and (d) is valid, this method could be applied to the conventional subtraction method, i.e., find the value of γ from the subtracted intensity $(I_{af}-I_{bf})$, and find ϕ/2. From eqs. (b) and (d), we obtain $$(|I^{af}|-|I^{bf}|)/4\sqrt{I_1 I_2}=\gamma(1-\cos \phi)=\gamma \cdot 2 \sin^2 (\phi/2) \quad (e)$$

Hence, by fitting (1 −cos) or 2 $\sin^2$ to the data set of $(|I^{af}|-|I^{bf}|)/4\sqrt{I_1 I_2}$, we can find γ using the same method as outlined above, and use the resulting y, we should be able to find the phase ϕ.

As discussed, the method allows for computation of the phase difference ϕ. Alternatively, once gamma is determined, the phase information before deformation and after deformation can be determined, for instance θ=$\cos^{-1}$ ($\cos\theta_{app}$/γ); hence, the phase difference can also be determined as $\theta-\theta_d$.

The invention claimed is:

1. A method of determining the phase difference for speckle interferograms, the method comprising the steps of:
   a) record the intensities along arm 1 $I_1$
   b) record the intensities along arm 2 $I_2$
   c) record the interference intensities $I_{F1}$ at time t1,
   d) record the interference intensities $I_{F2}$ at time t2, where t2>t1
   e) compute θ1'=$\cos^{-1}[(I_{F1}-I_1-I_2)/2\sqrt{I_1 I_2}]$
   f) compute θ2'=$\cos^{-1}[(I_{F2}-I_1-I_2)/2\sqrt{I_1 I_2}]$
   g) compute (sin [(θ2'−θ1')/k]),
   h) compute Max of the results in step g
   i) compute Min of the results in step g
   j) compute γ=(Max−Min)/2
   k) compute (1/γ)[Φ(θ2'−θ1')] where Φ is a bounded trig function;
   l) determine the phase by computing $\Phi^{-1}$ of the results in step k.

2. The method of claim 1 further including the step of unfolding the phase determined from step (1).

3. The method of claim 1 where the bounded trig function is cosine.

4. The method of claim 1 wherein the bounded trig function is sine.

5. The method of claim 1 where step g further includes the step of filtering said computed $\sin[(\theta 2'-\theta 1')/k]|$.

6. A method of determining the phase difference for speckle interferograms, the method comprising the steps of:
a) record the intensities along arm 1 $I_1$
b) record the intensities along arm 2 $I_2$
c) record the interference intensities $I_{F1}$, at time t1,
d) record the interference intensities $I_{F2}$ at time t2, where t2>t1
e) compute $\theta 1'=\cos^{-1}[(I_{F1}-I_1-I_2)/2\sqrt{I_1 I_2}]$
f) compute $\theta 2'=\cos^{-1}[(I_{F2}-I_1-I_2)/2\sqrt{I_1 I_2}]$
g) compute ABS(sin $[(\theta 2'-\theta 1')/k])$,
g.1) filter the results in step g
h) compute Max of the results in step g.1
i) compute Min of the results in step g.1
j) compute $\gamma$=(Max-Min)
k) compute $(1/\gamma)[\Phi(\theta 2'-\theta 1')]$ where $\Phi$ is a bounded trig function;
l) determine the phase by computing $\Phi^{-1}$ of the results in step k.

7. The method of claim 6 wherein the filter of step g.1 eliminates data points from the sequence of step g if abs(data point) is more than X standard deviations from the mean of the sequence, where X is a predetermined number.

8. The method of claim 2 wherein said unwrapping of the computed phase comprises the steps of fitting a function to the output of step (1).

9. The method of claim 8 wherein said fitted function is a polynomial.

10. A computer readable medium having recorded thereon executable instructions for performing the method of claim 1.

11. The method of claim 1 where k in step 7 is equal to 2.

* * * * *